United States Patent
Shetty et al.

(10) Patent No.: US 11,830,098 B2
(45) Date of Patent: Nov. 28, 2023

(54) DATA LEAK PREVENTION USING USER AND DEVICE CONTEXTS

(71) Applicant: VMWARE, INC., Palo Alto, CA (US)

(72) Inventors: Rohit Pradeep Shetty, Bengaluru (IN); Erich Peter Stuntebeck, Atlanta, GA (US); Ramani Panchapakesan, Bengaluru (IN); Suman Aluvala, Bengaluru (IN); Chaoting Xuan, Atlanta, GA (US)

(73) Assignee: VMWARE, INC., Palo Alto, CA (US)

( * ) Notice: Subject to any disclaimer, the term of this patent is extended or adjusted under 35 U.S.C. 154(b) by 277 days.

(21) Appl. No.: 16/794,265

(22) Filed: Feb. 19, 2020

(65) Prior Publication Data

US 2021/0209710 A1 Jul. 8, 2021

(30) Foreign Application Priority Data

Jan. 2, 2020 (IN) .............................. 202041000113

(51) Int. Cl.
*G10L 15/22* (2006.01)
*G06Q 50/26* (2012.01)
(Continued)

(52) U.S. Cl.
CPC ........... *G06Q 50/265* (2013.01); *G06F 21/74* (2013.01); *G06Q 10/107* (2013.01);
(Continued)

(58) Field of Classification Search
None
See application file for complete search history.

(56) References Cited

U.S. PATENT DOCUMENTS

| | | |
|---|---|---|
| 9,286,899 B1 | 3/2016 | Narayanan |
| 9,928,839 B1 | 3/2018 | Lester et al. |

(Continued)

FOREIGN PATENT DOCUMENTS

| | | |
|---|---|---|
| WO | 2016141972 A1 | 9/2016 |
| WO | 2017131267 A1 | 8/2017 |

OTHER PUBLICATIONS iMore.com, "What will happen if I delete a device from my iCloud account?" https://forums.imore.com/icloud/345348-what-will-happen-if-i-delete-device-my-icloud-account-html, Oct. 18, 2015 (Year: 2015).

(Continued)

*Primary Examiner* — William C Trapanese
(74) *Attorney, Agent, or Firm* — Thomas Horstemeyer, LLP

(57) ABSTRACT

Disclosed are various examples for audio data leak prevention using user and device contexts. In some examples, a voice assistant device can be connected to a remote service that provides enterprise data to be audibly emitted by the voice assistant device. In response to a request for the enterprise data being received from the voice assistant device, an audio signal can be generated that audibly broadcasts the enterprise data. The audio signal can be generated to audibly redact at least a portion of the enterprise data based at least in part on a mode of operation of the voice assistant device. The voice assistant device can be directed to emit the enterprise data through a playback of the audio signal.

20 Claims, 6 Drawing Sheets

(51) Int. Cl.
  *G06Q 10/109* (2023.01)
  *G06Q 10/107* (2023.01)
  *G10L 15/30* (2013.01)
  *G06F 21/74* (2013.01)

(52) U.S. Cl.
  CPC ............ *G06Q 10/109* (2013.01); *G10L 15/22* (2013.01); *G10L 15/30* (2013.01); *G10L 2015/223* (2013.01)

(56) References Cited

U.S. PATENT DOCUMENTS

| | | | |
|---|---|---|---|
| 10,063,542 | B1 | 8/2018 | Kao |
| 10,404,678 | B2 | 9/2019 | Grajek et al. |
| 10,524,092 | B2 | 12/2019 | Gandhi et al. |
| 10,719,591 | B1 | 7/2020 | Krieger et al. |
| 10,748,546 | B2 | 8/2020 | Kim et al. |
| 10,770,092 | B1 | 9/2020 | Adams et al. |
| 10,832,310 | B2 | 11/2020 | Isaacson et al. |
| 10,877,718 | B2 | 12/2020 | Gosu et al. |
| 11,070,949 | B2 | 7/2021 | Gross et al. |
| 2002/0076004 | A1 | 6/2002 | Brockenbrough et al. |
| 2004/0199538 | A1 | 10/2004 | Matsuda et al. |
| 2008/0021997 | A1 | 1/2008 | Hinton |
| 2008/0144944 | A1 | 6/2008 | Breed |
| 2009/0034702 | A1 | 2/2009 | Cai |
| 2010/0031329 | A1 | 2/2010 | Kim et al. |
| 2011/0307790 | A1 | 12/2011 | Pandya et al. |
| 2012/0262533 | A1* | 10/2012 | Gannu ............... H04M 3/567 704/E15.005 |
| 2013/0156194 | A1 | 6/2013 | Tanioka |
| 2013/0179692 | A1 | 7/2013 | Tolba et al. |
| 2014/0200893 | A1* | 7/2014 | Vanjani ............. H04N 21/4532 704/257 |
| 2014/0281547 | A1 | 9/2014 | Modzelewski et al. |
| 2015/0082427 | A1 | 3/2015 | Ivanchykhin et al. |
| 2015/0195406 | A1* | 7/2015 | Dwyer ............... G06F 40/279 379/265.07 |
| 2015/0244472 | A1 | 8/2015 | Poppe et al. |
| 2016/0119323 | A1 | 4/2016 | Krishna |
| 2016/0224548 | A1 | 8/2016 | Massand |
| 2016/0373490 | A1 | 12/2016 | Sedar et al. |
| 2017/0006044 | A1 | 1/2017 | Ezra et al. |
| 2017/0126640 | A1 | 5/2017 | Vincent et al. |
| 2017/0223613 | A1 | 8/2017 | Wang et al. |
| 2017/0329573 | A1 | 11/2017 | Mixter |
| 2017/0345105 | A1 | 11/2017 | Isaacson et al. |
| 2017/0346949 | A1 | 11/2017 | Sanghavi et al. |
| 2018/0007060 | A1 | 1/2018 | Leblang et al. |
| 2018/0122378 | A1 | 5/2018 | Mixter et al. |
| 2018/0137267 | A1 | 5/2018 | Krieger et al. |
| 2018/0176270 | A1 | 6/2018 | Griffin et al. |
| 2018/0199156 | A1 | 7/2018 | Gandhi et al. |
| 2018/0204187 | A1 | 7/2018 | Stewart et al. |
| 2019/0007381 | A1 | 1/2019 | Isaacson et al. |
| 2019/0116264 | A1 | 4/2019 | Sanghavi et al. |
| 2019/0132321 | A1 | 5/2019 | Pitchaimani |
| 2019/0163896 | A1 | 5/2019 | Balaraman et al. |
| 2019/0306137 | A1 | 10/2019 | Isaacson et al. |
| 2019/0318002 | A1 | 10/2019 | Sharma et al. |
| 2019/0339927 | A1 | 11/2019 | Gosu et al. |
| 2019/0361671 | A1 | 11/2019 | Maltsev et al. |
| 2019/0377898 | A1 | 12/2019 | Dunjic et al. |
| 2020/0084205 | A1 | 3/2020 | Bulpin |
| 2020/0120088 | A1 | 4/2020 | Jain et al. |
| 2020/0134211 | A1* | 4/2020 | Miller ................ G06F 21/6209 |
| 2020/0137053 | A1 | 4/2020 | Bhaya et al. |
| 2020/0228521 | A1 | 7/2020 | Edwards et al. |
| 2020/0349935 | A1 | 11/2020 | Smith et al. |
| 2020/0389314 | A1 | 12/2020 | Kunnath et al. |
| 2021/0058517 | A1 | 2/2021 | Serbajlo et al. |
| 2021/0072951 | A1 | 3/2021 | Gosu et al. |
| 2021/0119794 | A1 | 4/2021 | Shpurov et al. |
| 2021/0176229 | A1 | 6/2021 | Xuan et al. |
| 2021/0306329 | A1 | 9/2021 | Conley et al. |
| 2021/0409955 | A1 | 12/2021 | Stuntebeck et al. |
| 2022/0237273 | A1 | 7/2022 | Krieger et al. |

OTHER PUBLICATIONS

Klein, "How to Remove Devices from Your iCloud Account" https://www.howtogeek.com/240710/how-to-remove-devices-from-your-icloud-account/, Jul. 11, 2017 (Year: 2017).

* cited by examiner

DATA LEAK PREVENTION USING USER AND DEVICE CONTEXTS

RELATED APPLICATIONS

Benefit is claimed under 35 U.S.C. 119(a)-(d) to Foreign Application Serial No. 202041000113 filed in India entitled "DATA LEAK PREVENTION USING USER AND DEVICE CONTEXTS" on Jan. 2, 2020, by VMWARE, Inc., which is herein incorporated in its entirety by reference for all purposes.

BACKGROUND

In enterprise settings, individuals can utilize a number of different services and applications in order to complete tasks for an enterprise or other organization. With the proliferation of personal voice assistants in the enterprise world, employees and other individuals are being assigned voice assistant devices, which are frequently used to retrieve enterprise data at their desks, in their offices, and potentially in public spaces. However, most of the voice abilities available to these individuals audibly announce email contents, appointments, reminders etc. verbatim without redaction. This can be problematic when sensitive information is being audibly broadcasted in an insecure environment. For instance, visitors or other non-authorized individuals can potentially overhear sensitive information being vocalized using personal voice assistant devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
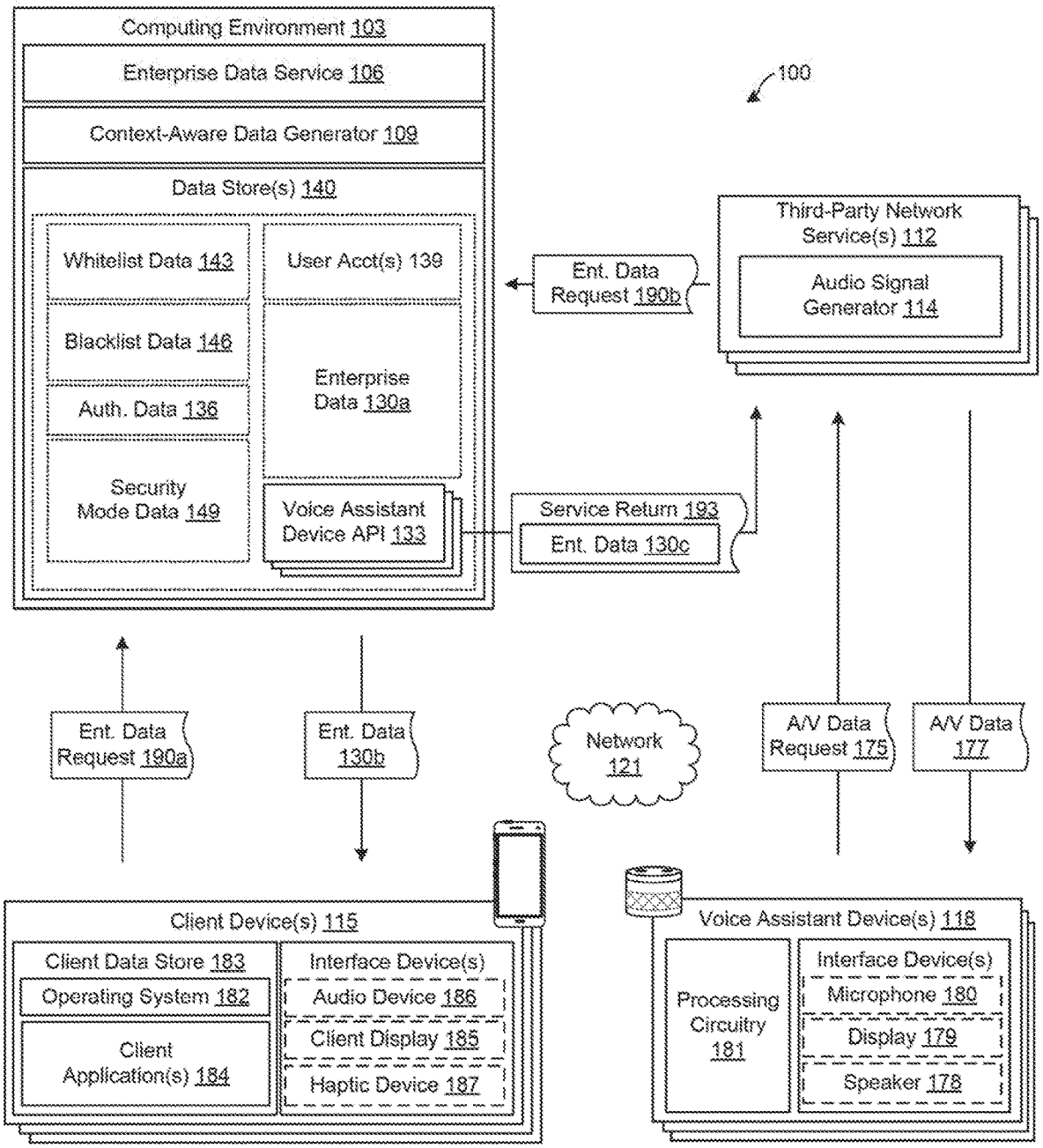
FIG. 1 is a drawing of an example of a networked environment, including a computing environment, client devices, network services, voice assistant devices, and other components in communication through a network.

The present disclosure relates to data leak prevention of enterprise data on personal voice assistants using user and device contexts. Voice assistant devices, such as those that react to audible commands to broadcast news, play music, provide the weather, and other tasks, are becoming increasingly used in enterprise settings. For instance, many enterprises are now supplying employees or other individuals with voice assistant devices. The voice assistant devices are frequently used to audibly broadcast data at their desks, in their offices, and potentially in public spaces. In some instances, the voice assistant devices are used to broadcast enterprise data, which can include confidential or proprietary data, or data that should not be overhead by individuals not associated with the enterprise, an organizational unit, and so forth. For instance, voice assistant devices are being used to audible broadcast emails, calendar entries, and other data that can be overhead by eavesdroppers in the vicinity of a voice assistant device.

Accordingly, in various examples, a computing environment having one or more computing devices is described, where the computing environment can connect a voice assistant device to a remote service that provides enterprise data to be audibly emitted by a voice assistant device. When a request for enterprise data is received from the voice assistant device, the computing environment can generate an audio signal that audibly broadcasts and/or visually displays the enterprise data on the voice assistant device. Further, in some examples, the computing environment can generate the audio signal such that at least a portion of the enterprise data is audibly redacted. In some examples, the portion of the enterprise data is redacted based on a mode of operation of the voice assistant device, which can include one of a multitude of security modes, as will be described. Ultimately, the computing environment can direct the voice assistant device to emit the enterprise data as redacted through a playback of the audio signal.

To this end, the computing environment can maintain a multitude of differing security modes in association of the voice assistant device or a user thereof. As such, when a request for enterprise data is received from a voice assistant device, the computing environment can identify an active one of the security modes and can generate the audio signal based on policies associated with the active one of the security modes. The active one of the security modes, or policies employed by different ones of the security modes, can be determined automatically using user and device contexts. With respect to user contexts, in some examples, an electronic calendar entry can be analyzed to determine whether multiple individuals are in a vicinity of a voice assistant device and, if so, a higher security mode of operation can be assigned.

With respect to device context, in some examples, an operator of the voice assistant device can perform a vocalized command that directs the computing environment to change an active one of the security modes to another one of the security modes. In further examples, the computing environment can automatically select one of the security modes to make active. For instance, the computing environment can set the voice assistant device in a data leak prevention (DLP) mode when multiple individuals are detected within an audible range of the voice assistant device, when an analysis of a calendar item indicates that multiple individuals may be present, and so forth. In further examples, the computing environment can select one of the security modes without a verbalized command. Instead, the computing environment can select one of the security modes based on a sensitivity of the enterprise data to be audibly broadcasted by the voice assistant device.

The enterprise data can include an email, a calendar item, a reminder, an instant message, a short message service (SMS) message, a combination thereof, as well as other enterprise data as can be appreciated. Additionally, a portion of the enterprise data can be redacted in the audio signal by replacing the portion of the enterprise data with a predetermined audio tone, static sound, silence, or other audio signal.

With reference to FIG. 1, an example of a networked environment 100 is shown. The networked environment 100 can include a computing environment 103 executing an enterprise data service 106 and a context-aware data generator 109, third-party network services 112 executing an audio signal generator 114, client devices 115, and a voice assistant device 118 in communication through a network 121.

The network 121 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 121 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 121 can also include a combination of two or more networks 121. Examples of networks 121 can include the Internet, intranets, extranets, virtual private networks (VPNs), and similar networks.

The computing environment 103 executing the enterprise data service 106 and the context-aware data generator 109 can include a server computer or any other system providing computing capability. While referred to in the singular, the computing environment 103 can include a plurality of computing devices that are arranged in one or more server banks, computer banks, or other arrangements. The computing devices of the computing environment 103 can be located in a single installation or can be distributed among many different geographical locations local and/or remote from the other components.

The computing environment 103 can include a grid computing resource or any other distributed computing arrangement. The computing environment 103 can also include, or be operated as, one or more virtualized computer instances. For purposes of convenience, the computing environment 103 is referred to herein in the singular. The components executed on the computing environment 103 can include the enterprise data service 106 and the context-aware data generator 109, as well as other applications, services, processes, systems, engines, or functionality not discussed in detail herein.

The enterprise data service 106 can serve up enterprise data 130a . . . 130c, such as email data, calendar data, reminder data, messaging data, document data, as well as other data, to individuals on their respective client devices 115. To this end, the enterprise data service 106 can be utilized by one or more enterprises, units thereof, or other organizations. In some examples, the enterprise data service 106 can provide virtualized computing resources, such as virtual machines, that provide virtual desktops on the client devices 115. Accordingly, the enterprise data service 106 can permit individuals to access enterprise applications from anywhere, or on various types of client device 115. The enterprise data service 106 can be part of a local network, trusted network, or intranet, which can be separate from the other components of the networked environment 103 in various examples.

The enterprise data service 106 can serve up enterprise data 130 directly to client devices 115 or through a proxy service. In some examples, however, the enterprise data service 106 can provide enterprise data 130 through a voice assistant device application programming interface 133. For instance, a user of a voice assistant device 118 can vocalize a command to the voice assistant device 118 that causes the voice assistant device 118 to generate and send a request for enterprise data 130. In one example, an employee of an enterprise can audibly state, "Device, what are my appointments for the day?" or "Device, please read my new emails." The voice assistant device 118 can thus send audio data captured by a microphone of the voice assistant device 118 to a third-party network service 112 which, in turn, translates the audio data into a request for enterprise data 130 to be sent to the voice assistant device application programming interface 133. Referring to the example above, the enterprise data service 106 can access an electronic calendar to identify appointments for the day, or can access new emails. When the enterprise data 130 is provided to the third-party network service 112, the audio signal generator 114 can generate an audio signal that, when played back on the voice assistant device 118, broadcasts the enterprise data 130 as provided to the third-party network service 112.

The enterprise data service 106 can include authentication functionality in some examples, which can include retrieving, caching, storing, and validating authentication data 136. The authentication data 136 can be used to determine whether the voice assistant device 118 and/or a user of the voice assistant device 118 has sufficient privileges to access enterprise data 130. In some examples, a user of the voice assistant device 118 must enroll the voice assistant device 118 with the enterprise data service 108, using a client device 115 for instance, prior to accessing enterprise data 130 on the voice assistant device 118. For example, a user can use the client device 115 to provide a unique identifier for the voice assistant device 118 as well as authentication data 136, such as a username, email, password, biometric data, or other information.

If authentication is successfully performed using the authentication data 136, the enterprise data service 106 can connect or otherwise associate the voice assistant device 118 with a user account 139 based on the authentication data 136 provided. For instance, the unique identifier of the voice assistant device 118 can be stored in a database in associated with the user account 139. As such, the enterprise data service 106 can serve up any enterprise data 130 associated with the user account 139, such as emails, calendar items, spreadsheet data, word processing document data, and other data as can be appreciated.

The computing environment 103 can include a data store 140, which can include any storage device or medium that can contain, store, or maintain the instructions, logic, or applications described herein for use by or in connection with the computing environment 103. The data store 140 can be a hard drive or disk of a host, server computer, or any other system providing storage capability. In some examples, the data store 140 can include a network storage service, for instance, provided by the third-party network service 112. While referred to in the singular, the data store 140 can include a plurality of storage devices that are arranged in one or more hosts, server banks, computer banks, or other arrangements. The data store 140 can include any one of many physical media, such as magnetic, optical, or semiconductor media. Other examples include solid-state drives or flash memory.

The data store 140 can include memory of the computing environment 103, mass storage resources of the computing environment 103, or any other storage resources on which data can be stored by the computing environment 103. The data stored in the data store 140 can include, for example, enterprise data 130, authentication data 136, user accounts 139, as well as whitelist data 143, blacklist data 146, security mode data 149, and other data. User accounts 139 can include data associated with employees of the enterprise or other individuals having access to enterprise data 130. As such, the user accounts 139 can include data such as email address, organizational unit, first name, middle name, last name, authentication data 136, device identifiers for connected voice assistant devices 118 and/or client devices 115, as well as other data. Security mode data 149 can include data associated with security modes of the voice assistant devices 118 as well as policies associated therewith. Policies can include criteria that, when met, causes enterprise data 130 to be audibly redacted.

For instance, as it is undesirable for the voice assistant device 118 to audibly broadcast sensitive enterprise data 130, in some examples, the context-aware data generator 109 can redact certain words, phrases, or other portion of the enterprise data 130 to be broadcasted by the voice assistance device 118. As such, in some examples, an administrator of an enterprise, or a user, can define certain words, phrases, regular expressions, or other content as whitelist data 143, indicating that the content is permitted to be audibly broadcasted by the voice assistant device 118. Conversely, in some examples, the administrator of the enterprise, or the user, can define certain words, phrases, regular expressions, or other content as blacklist data 146, indicating that the content is not permitted to be audibly broadcasted by the voice assistant device. In some examples, the whitelist data 134 and/or the blacklist data 146 can include a list of keywords, clients, or other filters that can be used by the context-aware data generator 109 to determine whether to permit or deny inclusion of a word, phrase, or other content based on a currently active security mode of the voice assistant device 118.

In some examples, a user of the voice assistant device 118 can create a custom security mode by providing different filters for the custom security mode. For instance, a user can set filters for terms deemed confidential, such as sales figures, email addresses, phone numbers, names of clients, and so forth. Based on a security mode made active on the voice assistant device 118, particular words matching the filter criteria can either be skipped or redacted when the voice assistant device 118 reads out the emails, calendar items, etc. In a more secure mode, emails or calendar items containing such confidential words can be skipped such that the voice assistant device 118 does not audibly broadcast any data associated with the emails, calendar items, or other enterprise data 130.

In some examples, the computing environment 103 can change an active one of the security modes on a voice assistant device 118, for instance, based on user or device contexts. For example, if multiple persons are identified in a vicinity of a voice assistant device 118, the computing environment 103 can ensure that an active one of the security modes prevents the dissemination of sensitive materials. In another example, if the enterprise data 130 to be played back on the voice assistant device 118 uses one or more predefined terms, such as "confidential," "privileged," "proprietary," or other customizable word or phrase, the computing environment 103 can automatically change the security mode of the voice assistant device 118 to one in which sensitive enterprise data 130 is subject to redaction policies.

The security mode data 149 can include data associated with one or more security modes of the voice assistant device 118. For instance, a first one of the security modes can be made active to abstain from redacting any content to be audibly broadcasted by the voice assistant device 118. A second one of the security modes, however, can be made active to redact content to be audibly broadcasted by the voice assistant device 118, for instance, based on the whitelist data 143, the blacklist data 146, or other sensitivity levels associated with the content. Different security modes can be more restrictive on the enterprise data 130 permitted for dissemination, as can be appreciated. The data stored in the data store 140 can be associated with the operation of the various applications and/or functional entities described.

The third-party network services 112 can include web applications, web services, or other network facing applications. One or more third-party network services 112 can be provided by the same provider or by different providers. The third-party network services 112 can include one or more network services offered by a manufacturer of the voice assistant device 118 in some examples. Also, the third-party network services 112 can include an audio signal generator 114 that generates audio signals, such as audio files, to be broadcasted on voice assistance devices 118. In other examples, the computing environment 103 provides enterprise data 130 to the audio signal generator 114 which, in turn, generates an audio signal that audibly broadcasts the enterprise data 130 as provided. In some examples, the third-party network service 112 can provide user interface data or other network content to present on a display of the voice assistant device 118, assuming the voice assistant device 118 is a device having a display.

The third-party network services 112 can receive audio-video data requests 175 from the voice assistant devices 118, and provide audio-video data 177 based on the audio-video data requests 175. The audio-video can include an audio signal to be emitted by a speaker 178 of the voice assistant device 118 in some examples, or can include user interface data or media data, such as video data, to be shown on a display 179 of the voice assistant device 118.

It is understood that, in some examples, the voice assistant device 118 does not include a display 179, and merely includes a microphone 180 (and potentially one or more buttons) as an input interface device and a speaker 178 as an output interface device. However, in other examples, the voice assistant device 118 may include a display 179 for rendering a user interface or other media thereon.

The voice assistant device 118 can further include processing circuitry 181 that can cause an audio signal to be broadcast over the speaker 178, or can cause a user interface or video to be rendered on the display 179. The display 179 can include a liquid crystal display (LCD), organic light emitting diode (OLED) display, touch-screen display, or other type of display device. The processing circuitry 181 can include an application specific integrated circuit (ASIC)

in some examples, or can include a programmable computing device having at least one hardware processor and memory.

The client device 115 can be representative of one or more client devices 115. The client device 115 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, a voice activated smart device, or any other device with like capability. The client device 115 can have an operating system 182 that can perform functionalities and execute applications. The operating system 182 can be stored in a client data store 183 that also includes client applications 184. The client device 115 can execute the client applications 1849 to perform or access the functionality described for the enterprise data service 106.

Along with the voice assistant device 118, the client device 115 can be equipped with networking capability or networking interfaces, including a localized networking or communication capability, such as a near-field communication (NFC) capability, radio-frequency identification (RFID) read or write capability, or other localized communication capability. In some embodiments, the client device 115 is mobile where the client device 115 is easily portable from one location to another, such as a smart phone, tablet, or laptop computer. In other situations, the client device 115 can be a desktop machine or a kiosk at a particular location. Like the voice assistant device 118, the client device 115 can include interface devices that can be utilized to interact with users. The interface device can include, for example, audio devices 186, client displays 185, and haptic devices 187.

The operating system 182 of the client device 115 can execute various client functionalities or client applications 184, such as a management application, a browser application, a voice interaction functionality, or another application. The operating system 182 and some client applications 184 can access network content served up by the computing environment 103, or other servers and can present this information to a user on a client display 185. For example, the client device 115 can render a user interface on the client display 185, such as a liquid crystal display, organic light emitting diode display, touch-screen display, or other type of display device. The client device 115 can also present audio information using the audio device 186, and can provide haptic or physical feedback using the haptic device 187.

Some client applications 184 can include a browser or a dedicated application, and a user interface can include a network page, an application screen, or other interface. The client device 115 can also access web applications using a browser application. Further, other client applications 184 can include device management applications, enterprise applications, social networking applications, word processors, spreadsheet applications, media player applications, or other applications.

In some examples, one of the client applications 184 can include an agent application that enrolls the client device 115 with the computing environment 103. The agent application can perform actions as directed by the computing environment 103, for instance, by checking in with the enterprise data service 106 or other management service of the computing environment 103, retrieving a command from the command queue, and implementing the command on the client device 115. In some examples, the enterprise data service 106 can send a configuration profile to an operating system 182 of the client device 115 that causes the agent application to obtain administrator privileges on the client device 115.

A user of the client device 115 can interact with the client applications 184 to retrieve enterprise data 130, for instance, by sending enterprise data requests 190a, 190b. Alternatively, if the user interacts with the voice assistant device 118 to request enterprise data 130, the voice assistant device 118 sends an audio-video data request 175 which, in turn, causes the third-party network service 112 to send an enterprise data request 190 to the enterprise data service 106. The computing environment 103 can send the enterprise data 130 as a service return 193, as can be appreciated.

Figure 2:
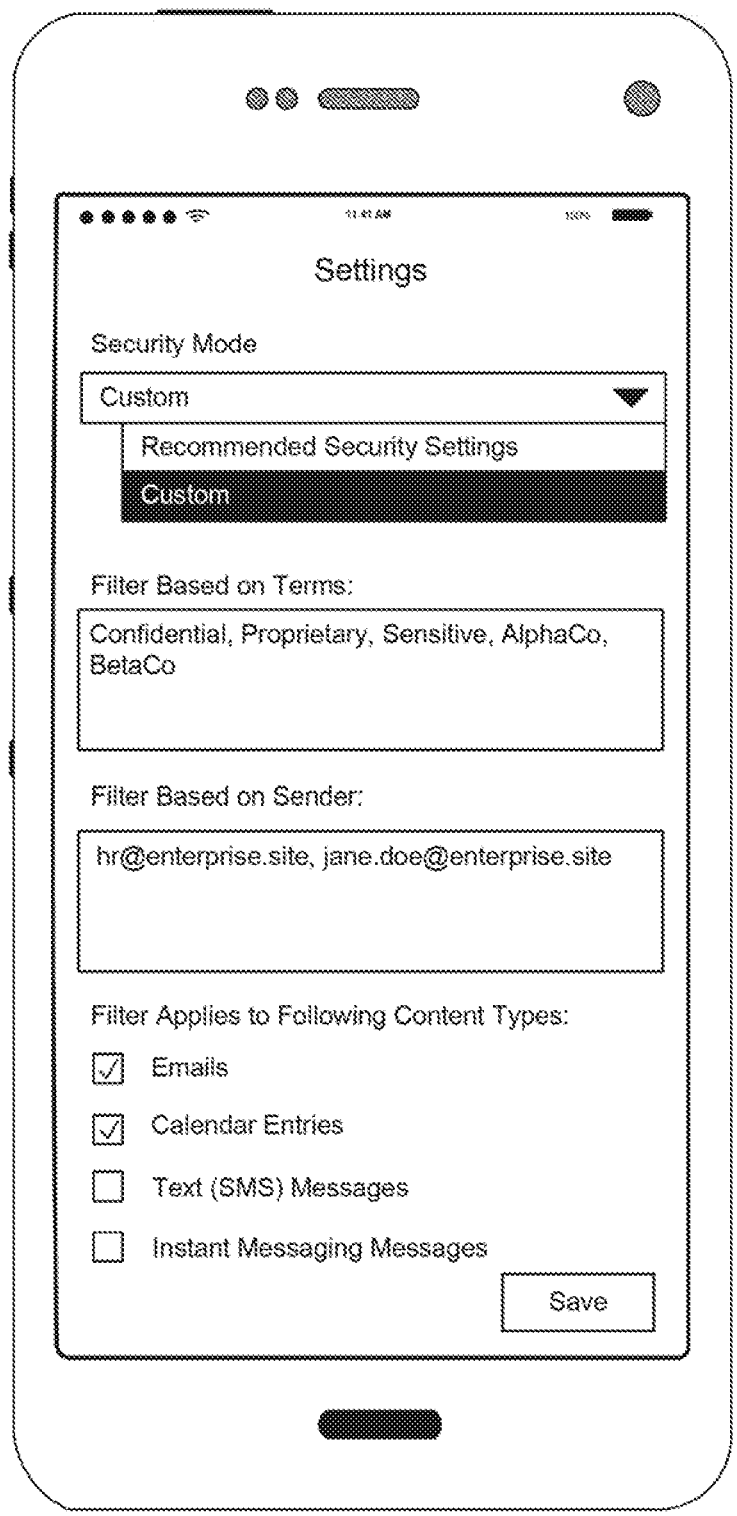
FIG. 2 is a drawing illustrating an example user interface rendered by the computing environment for defining settings for a voice assistant device.

FIG. 2 shows an example of a user interface rendered on a display 185 of a client device 115. In some examples, a user can access a web page or a client application 184 on the client device 115 to set filters for terms he or she considers confidential, such as sales figures, private meetings, email addresses, phone numbers, and names of corporate clients. The filters defined in the user interface can be added to the data store 140 in association with a security mode of the voice assistant device 118, for instance, as whitelist data 143, blacklist data 146, or security mode data 149. Based on a security mode made active on a voice assistant device 118, the words or associated content matching predefined criteria can be removed or permitted when voice assistant device 118 audibly broadcasts the enterprise data 130.

In some examples, the user can define a multitude of security modes having varying policies and levels of security. For instance, a lowest security mode can avoid redacting any enterprise data 130 and a highest security mode can redact all enterprise data 130 matching predefined criteria, such as the criteria that can be established using the user interface 200 of FIG. 2. For instance, some emails or appointments containing the term "confidential" may be completely skipped. An intermediate security mode can redact some terms or phrases while permitting others to be audibly broadcasted. For instance, confidential sales numbers can be redacted, but non-confidential email items can be audibly broadcasted.

Accordingly, different ones of the security modes can be facilitated either by filters created by a user or an administrator for certain divisions within an enterprise. Thus, security modes can differ from user to user, and even division to division in a single organization. For example, a sales division for AlphaCo, an enterprise, might have data loss prevention policies performed on sales contacts, active contract, deal size, or other information, whereas the human resources organization unit can have data loss prevention policies performed on parameters, such as compensation, complaints, whistle blower information, and so on. In further examples, a third-party data loss prevention solution, for instance, one already deployed by an organization, can be used to facilitate a security mode that implements data loss prevent as described above. For instance, a third party mode can automatically redact content using previously set filters on enterprise data 130 and other information provided by the computing environment 103.

In another example, explicit and/or implicit access rules can be automatically propagated and incorporated, which can be defined in the source of content. For instance, for email content, if an email is labeled as "Confidential," then any user account 139 that is not in the sender and recipient list of this email is not supposed to listen to its content and, as such, redaction of the enterprise data 103 can occur. Similarly, shared documents can be redacted based on an author, recipient, and other information.

Figure 3:
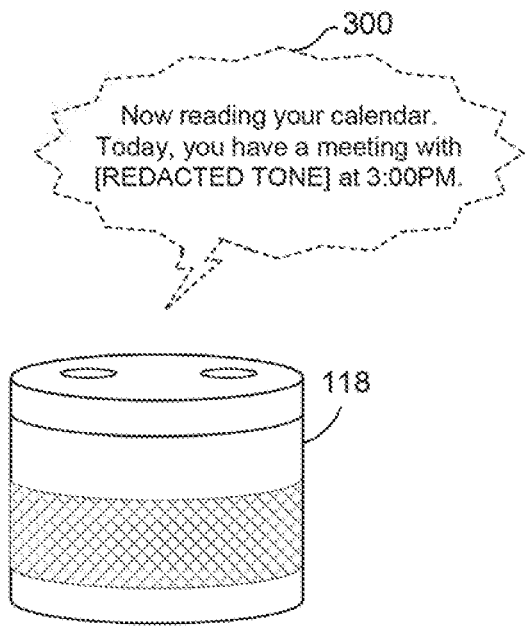
FIG. 3 is a drawing illustrating functionalities implemented by the computing environment using a voice assistant device.
Figure 4:
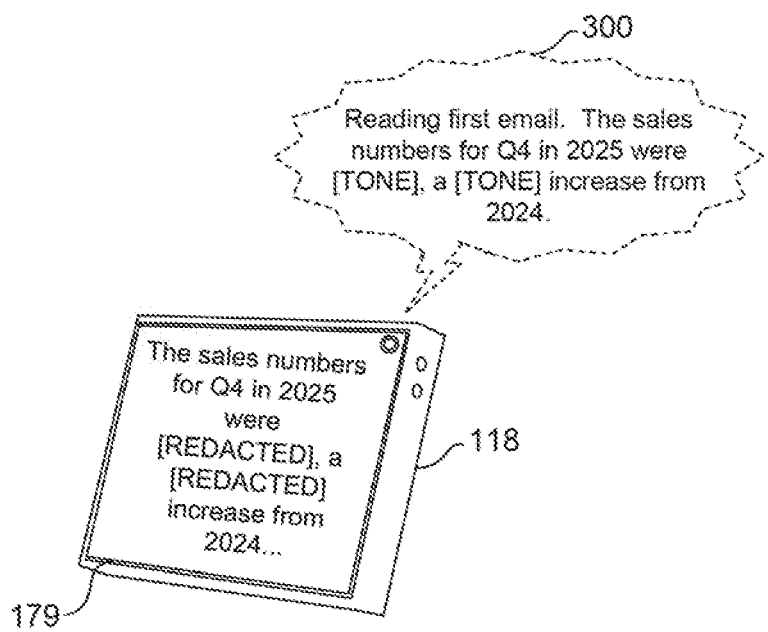
FIG. 4 is a drawing illustrating functionalities implemented by the computing environment using a voice assistant device.

Turning now to FIGS. 3 and 4, different examples of a voice assistant device 118 are shown. The voice assistant device 118 can include one having a microphone 180 for receiving voice commands from a user. The voice assistant device 118 further includes processing circuitry 181 that captures voice data through the microphone 180 and sends the voice data for analysis by a third-party network service 112 through a network interface. Upon receipt, the third-party network service 112 can translate the voice data into text, and determine a command provided by a user from the text. For instance, if the user commands the voice assistant device 118 to provide weather for the week, the third-party network service 112 can identify the command from the audio data and query a weather network service to obtain weather data based on a location of the voice assistant device 118. In some examples, an audio-to-text translation can be performed. The third-party network service 112 can send the weather data to the audio signal generator 114 to generate an audio signal 300 that can be played back on a speaker 178 of the voice assistant device 118.

In some examples, however, the third-party network service 112 integrates with the enterprise data service 106 to provide enterprise data 130 to an operator of the voice assistant device 118. For instance, the operator can connect or otherwise associate his or her enterprise user account 139 with the voice assistant device 118 to access enterprise data 130, such as emails, work documents, instant messages, and other enterprise data 130. In one example, the operator can audibly state, "Device, what's on my calendar for today?" The third-party network service 112 can identify the command from the audio data and realize that "calendar" invokes a calendar application offered by the enterprise data service 106. As such, the third-party network service 112 can query the enterprise data service 106 to obtain enterprise data 130, more specifically, calendar items for the current day for the user account 139 associated with the voice assistant device 118. Using the audio signal generator 114, the third-party network service 112 can translate text and other data from the calendar items into an audio signal that can be played back on a speaker 178 of the voice assistant device 118.

In some examples, however, the computing environment 103 can direct the audio signal 300 to be generated such that at least a portion of the enterprise data 130 is audibly redacted. For instance, if the voice assistant device 118 is in a secure mode of operation, or a higher security mode of operation as compared to other security modes, the enterprise data service 106 can remove or redact portions of the enterprise data 130 provided to the third-party network service 112. The redacted portions of FIGS. 3 and 4 are denoted using "[REDACTED TONE]" and "[TONE]," where it is understood that a predetermined tone, beeping, white noise, or silence can be played in place of the redacted content.

In some examples, the enterprise data service 106 redacts the enterprise data 130 locally on the computing environment 103. For instance, the enterprise data service 106 may remove confidential, proprietary, or other sensitive data and provide a placeholder, such as "REDACTED," that instructs the audio signal generator 114 to insert a predetermined tone, white noise, static, silence, or other appropriate audio.

In alternative examples, the enterprise data service 106 provides the enterprise data 130 to the third-party service 112 without redaction, but with information on what content should be redacted. In other words, the enterprise data service 106 can instruct the third-party network service 112 which portions of the enterprise data 130 to remove which, in turn, instructs the audio signal generator 114 to replace the content to be redacted with a predetermined tone, white noise, static, silence, or other appropriate audio in redacted portions of the enterprise data 130.

Notably, the voice assistant device 118 shown in FIG. 3 does not include a display 179. As such, it is understood that the enterprise data 130 is provided audibly through the speaker 178 of the voice assistant device 118. Alternatively, as shown in FIG. 4, in some examples, the voice assistant device 118 can include a display 179. In some examples, the processing circuitry 181 of the voice assistant device 118 shows content on the display 179 as content is audibly being broadcasted through the speaker 178. As can be appreciated, the content shown in the display 179 can be redacted or censored, similar to the audio signal generated by the audio signal generator 114.

Figure 5:
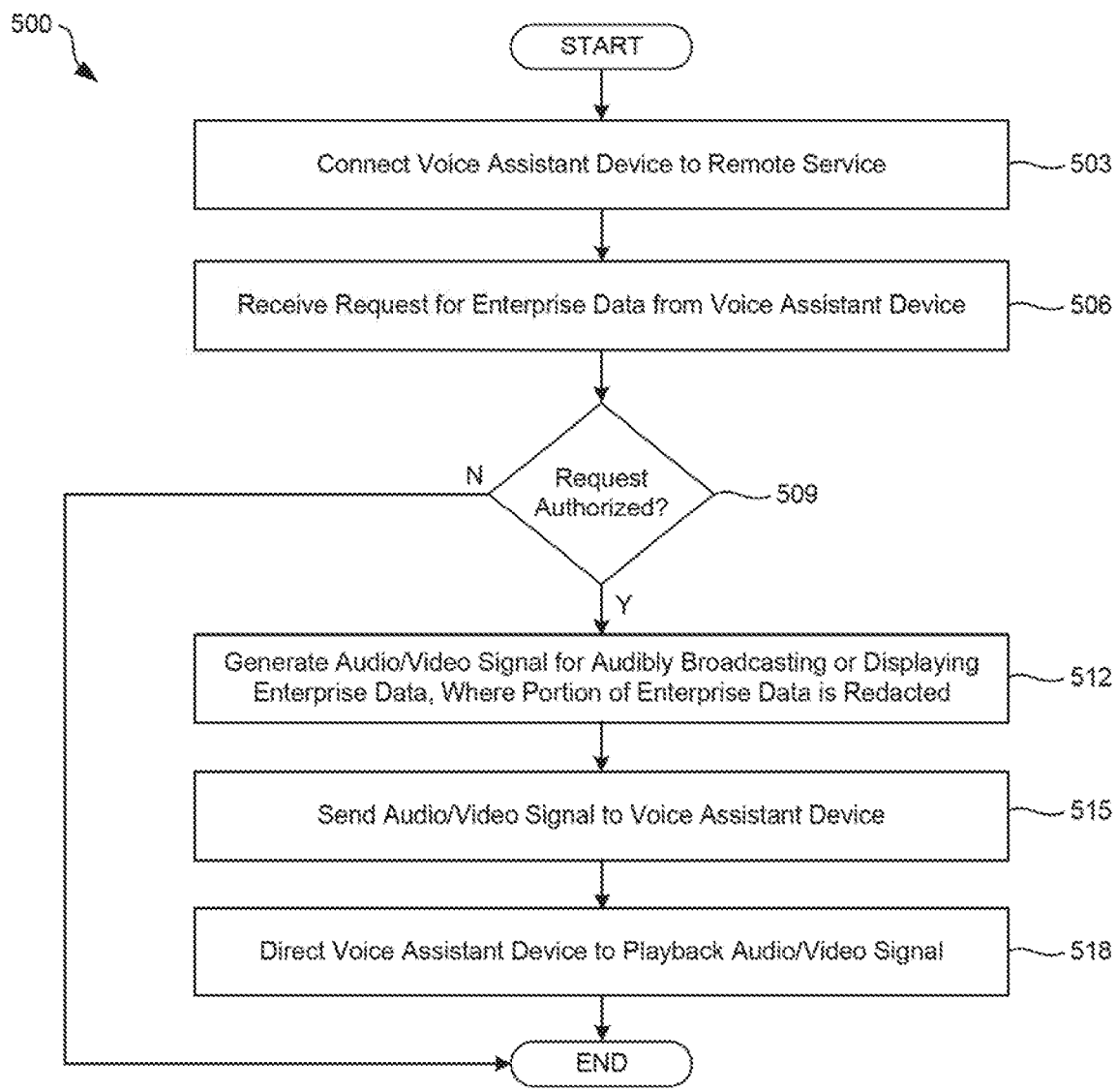
FIG. 5 is a flowchart depicting functionalities implemented by the computing environment and other components of the networked environment.

While the enterprise data 130 is shown as being redacted in the display 179, in alternative examples, the enterprise data 130 can be shown in the display 179 without redaction. More specifically, the audio signal 300 having the enterprise data 130 as redacted can be broadcasted; however, the FIG. 5 shows an example of a flowchart 500 describing steps that can be performed by the computing environment 103. Generally, the flowchart 500 describes the interaction between the computing environment 103, the voice assistant device 118, and the third-party network services 112 in the networked environment 100 of FIG. 1.

Beginning with step 503, the computing environment 103 can connect or otherwise associate a voice assistant device 118 with a remote service, where the remote service can include the enterprise data service 106 or other remote device management service.

In some examples, to connect a voice assistant device 118 with the enterprise data service 106, a user can interact with a client device 115 to provide a unique identifier or other information capable of uniquely identifying a voice assistant device 118 as well as authentication data 136. The authentication data can include information associated with an enterprise user account 139, such as a username, email, password, biometric data, or other information.

Prior to connecting the voice assistant device 118 to the remote service, the computing environment 103 can authenticate a user of the client device 115 and/or voice assistant device 118. If authentication is successfully performed using the authentication data 136, the enterprise data service 106 can connect or otherwise associate the voice assistant device 118 with a user account 139 based on the authentication data 136 provided. For example, a unique identifier of the voice assistant device 118, or other identifying information, can be stored in the data store 140 in associated with the user account 139. Accordingly, the computing environment 103 can receive serve requests from the voice assistant device 118 by providing request enterprise data 130 associated with the user account 139, such as emails, calendar items, spreadsheet data, word processing document data, reminders, and other data as can be appreciated.

For instance, in step 506, the computing environment 103 can receive a request for enterprise data 130 from the voice assistant device 118. In some examples, the request can include an enterprise data request 190 received directly from the voice assistant device 118 or an enterprise data request 190 received from the third-party network service 112 negotiating on behalf of the voice assistant device 118. In some examples, the request can include a unique identifier or other identifying information for the voice assistant device 118 originating the request. As such, the computing environment 103 can identify a corresponding user account 139 from the unique identifier, and can identify enterprise data 130 associated with the user account 139.

However, prior to sending any enterprise data 130, in step 509, the computing environment 103 can first determine whether the request is authorized. In some examples, the computing environment 103 can determine whether the device identifier is a valid device identifier, for instance, based on an arrangement of the identifier or communications with the third-party network service 112. For instance, if the third-party network service 112 is operated by a manufacturer of the voice assistant device 118, the third-party network service 112 can determine whether the voice assistant device 118 is an authorized and secure type of voice assistant device 118, or one permitted to access enterprise data 130 sent from the enterprise data service 106.

Additionally, the computing environment 103 can determine whether the request is authorized based on the user account 139 being active. In further examples, the computing environment 103 can determine whether the request is authorized based on the voice assistant device 118 and/or the client device 115 complying with one or more predefined compliance rules. For instance, an administrator of the enterprise data service 106 can deny enterprise data 130 being provided to any of the devices if one of the devices were rooted, jailbroken, or subject to another security vulnerability.

Referring again to step 509, if the request is not authorized, the process can proceed to completion and enterprise data 130 is not provided to the voice assistant device. Alternatively, in step 509, if the request is authorized by the computing environment 103 and/or the third-party network services 112, the process can proceed to step 512.

In step 512, the computing environment 103 can generate an audio and/or video signal for audibly broadcasting the enterprise data 130 identified in the request. In some examples, the computing environment 103 first retrieves the enterprise data 130 from the data store 140, for instance, based on the user account 139. The enterprise data 130 can include an email, a calendar item, a reminder, an instant message, a short message service message, a combination thereof, as well as other enterprise data 130 as can be appreciated.

The audio signal 300 can include an audio file or a stream of audio content in some examples generated using a text-to-speech convertor. Similarly, the video signal can include a video file or stream of video content that displays the text of the enterprise data 130 or a translation thereof. Alternatively, the video signal can include user interface data, such as a web page or similar network content capable of rendering a user interface in a display 179 of the voice assistant device 118.

In some examples, the computing environment 103 can generate the audio or video signally locally in the computing environment 103. In alternative examples, the computing environment 103 can direct the third-party network service 112, or the audio signal generator 114 thereof, to generate the audio or video signal remotely from the computing environment 103. In alternative examples, the voice assistant device 118 can include a local voice signal generator and, as such, the computing environment 103 can direct the local audio signal generator to generate the audio signal 300 on the voice assistant device 118.

In some examples, the enterprise data service 106 can generate the audio or video signal by redacting enterprise data 130 locally on the computing environment 103. For instance, the enterprise data service 106 can remove confidential, proprietary, other sensitive data, or enterprise data 130 matching predefined criteria specified by a user or administrator. The computing environment 103 can insert a placeholder into the enterprise data 130, such as "REDACTED," that instructs the audio signal generator 114 to insert a predetermined tone, white noise, static, silence, or other appropriate audio.

In alternative examples, the enterprise data service 106 provides the enterprise data 130 to the third-party service 112 in a data object without redaction, but with information on what content should be redacted. In other words, the enterprise data service 106 can instruct the third-party network service 112 which portions of the enterprise data 130 to remove which, in turn, instructs the audio signal generator 114 to replace the content to be redacted with a predetermined tone, white noise, static, silence, or other appropriate audio in redacted portions of the enterprise data 130. Similarly, any user interface data to be shown on the display 179 of the voice assistant device 118 can be similar redacted, as shown in FIG. 4.

Referring again to FIG. 5, the computing environment 103 can send the audio and/or video signal to the voice assistant device 118 for playback and/or display of the enterprise data 130 on the voice assistant device 118. For instance, assuming a user verbally commands the voice assistant device 118 to read latest emails, the voice assistant device 118 can audibly broadcast, "Reading first email. The sales numbers for Q4 for 2025 were [PREDFINED TONE], a [PREDFINED TONE] increase from 2024." When audibly broadcasted, a predetermined tone, beeping, white noise, or silence can be played back in place of the "PREDEFINFED TONE" placeholder. Similarly, the content can be shown in the display 179 of the voice assistant device 118 as redacted, as shown in FIG. 4.

Accordingly, in step 518, the computing environment 103 can direct the voice assistant device 118 to playback or display the audio and/or video signal data on the voice assistant device 118, as illustrated in the examples of FIGS. 3 and 4. In instances in which emails, appointments, or other enterprise data 130 that has been skipped or not broadcasted or displayed on the voice assistant device 118 can be replaced with a custom sound or similar cues. As such, when the user hears the custom sound or other cue, the user will understand that confidential data has been skipped. In some examples, while the enterprise data 130 has not be broadcasted through the speaker 178, voice assistant devices 188 having a display 179 may show redacted content in its entirety or, in other words, without redaction, on the display 179. In other examples, push notifications, text messages, or instant messages can be sent to a client device 115 also associated with the user account 139 to display the enterprise data 130 without redaction while the redacted version of the enterprise data 130 is being broadcast by the speaker 178. Thereafter, the process can proceed to completion.

Figure 6:
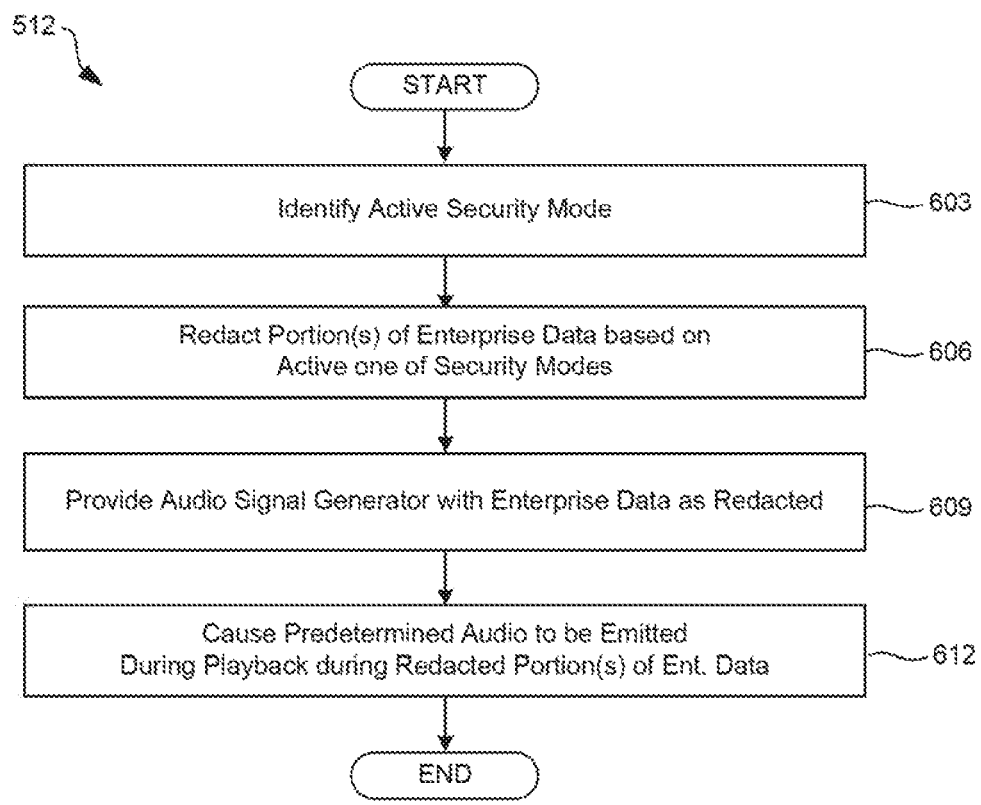
FIG. 6 is another flowchart depicting functionalities implemented by the computing environment and other components of the networked environment.

Moving on, FIG. 6 shows an example flowchart describing additional steps that can be performed by the computing environment 103 in performing step 512. Beginning with step 603, in some examples, the computing environment 103 can identify an active security mode on the voice assistant device 118. For instance, in some examples, if non-authorized persons are in a user's office, the user can instruct the voice assistant device 118 to enter a DLP mode or other secure mode of operation by stating, "Please enter DLP mode."

Notably, the computing environment 103 can maintain a multitude of differing security modes in association of the voice assistant device 118 or in association with a corresponding user account 139. As such, when a request for enterprise data 130 is received from a voice assistant device 118, the computing environment 103 can identify an active one of the security modes and can generate the audio signal 300 based on the active one of the security modes.

The active one of the security modes, or policies employed by different ones of the security modes, can be determined automatically using user and device contexts in some examples. With respect to user context, in some examples, an electronic calendar entry can be analyzed to determine whether multiple individuals are in a vicinity of a voice assistant device and, if so, a higher security mode of operation can be assigned. The detection of multiple individuals is described in greater detail below with respect to FIG. 8.

With respect to device context, in some examples, an operator of the voice assistant device 118 can perform a vocalized command that directs the computing environment 103 to change an active one of the security modes to another one of the security modes. In further examples, the computing environment 103 can automatically select one of the security modes to be active.

For instance, the computing environment 103 can set the voice assistant device 118 in a data leak prevention mode when multiple individuals are detected within an audible range of the voice assistant device 118, when an analysis of a calendar item indicates that multiple individuals may be present, and so forth. In further examples, the computing environment 103 can select one of the security modes without a verbalized command. Instead, the computing environment 103 can select one of the security modes based on a sensitivity of the enterprise data 130 to be audibly broadcasted by the voice assistant device 118.

In another example, the computing environment 103 can set the voice assistant device 118 in a data leak prevention mode when using human-imperceptible sounds that send a command to the third-party network services 112 or the computing environment 103. For instance, a client device 115 can be configured to emit a human-imperceptible sound when a meeting has started. The voice assistant device 118 can record the human-imperceptible sound, which is identified by the third-party network service 112 or the computing environment 103. In response, the computing environment 103 can set the voice assistant device 118 in a data leak prevention mode.

Next, in step 606, the computing environment 103 can redact portions of the enterprise data 130 (or an entire portion of the enterprise data 130) based on an active security mode. As it is undesirable for the voice assistant device 118 to audibly broadcast sensitive enterprise data 130, in step 606, the computing environment 103 can redact certain words, phrases, or other portion of the enterprise data 130 to be broadcasted by the voice assistance device 118. The words, phrases, or other portion of the enterprise data 130 can be defined by a user or an administrator of an enterprise in some examples, for example, using a user interface similar to that shown in FIG. 2. As such, in some examples, an administrator of an enterprise, or a user, can define certain words, phrases, regular expressions, or other content and filters as whitelist data 143, indicating that the content is permitted to be audibly broadcasted by the voice assistant device 118.

Alternatively, in some examples, the administrator of the enterprise, or the user, can define certain words, phrases, regular expressions, or other content and filters as blacklist data 146, indicating that the content is not permitted to be audibly broadcasted by the voice assistant device. In some examples, the whitelist data 134 and/or the blacklist data 146 can include a list of keywords, clients, or other filters that can be used by the context-aware data generator 109 to determine whether to permit or deny inclusion of a word, phrase, or other content based on a currently active security mode of the voice assistant device 118.

In further examples, the computing environment 103 can determine whether a voice assistant device 118 or an associated client device 115 is connected to headphones or an earphone. For instance, if the voice assistant device 118 or the associated client device 115 is connected to headphones or an earphone, the computing environment 103 can abstain from performing any redactions as any enterprise data 130 broadcasted is unlikely to be heard, even if multiple people are in vicinity of the voice assistant device 118.

In another example, the computing environment 103 can determine whether a voice assistant device 118 is assigned to a cubicle, meeting room, or other public space. For instance, if the computing environment 103 determines that the voice assistant device 118 is assigned to a meeting room, a default security mode of the voice assistant device 118 can include a data leak prevention mode or other security mode that automatically performs redactions, also if a corresponding meeting invite associated with the meeting room has multiple recipients.

In yet another example, the computing environment 103 can analyze general settings of the voice assistant device 118. For example, if a volume setting of a voice assistant device 118 is above a volume threshold, the computing environment 103 can automatically toggle the voice assistant device 118 to enter into a data leak prevention mode or other security mode that automatically applies redactions. At this time, the voice assistant device 118 can broadcast a warning to inform a user of the change to the voice assistant device 118.

In step 609, the computing environment 103 can provide the audio signal generator 114 with the enterprise data 130 as redacted. In alternative examples, the enterprise data service 106 provides the enterprise data 130 to the third-party service 112 without redaction, but with information on what content should be redacted. In other words, the enterprise data service 106 can instruct the third-party network service 112 which portions of the enterprise data 130 to remove which, in turn, instructs the audio signal generator 114 to replace the content to be redacted with a predetermined tone, white noise, static, silence, or other appropriate audio in redacted portions of the enterprise data 130.

Finally, in step 612, the computing environment 103 can cause the audio signal 300 to be broadcast by the voice assistant device 118 and, in turn, can direct the voice assistant device 118 to emit predetermined audio tones or sounds during playback of the redacted portions of the enterprise data 130. Thereafter, the process can proceed to completion.

Figure 7:
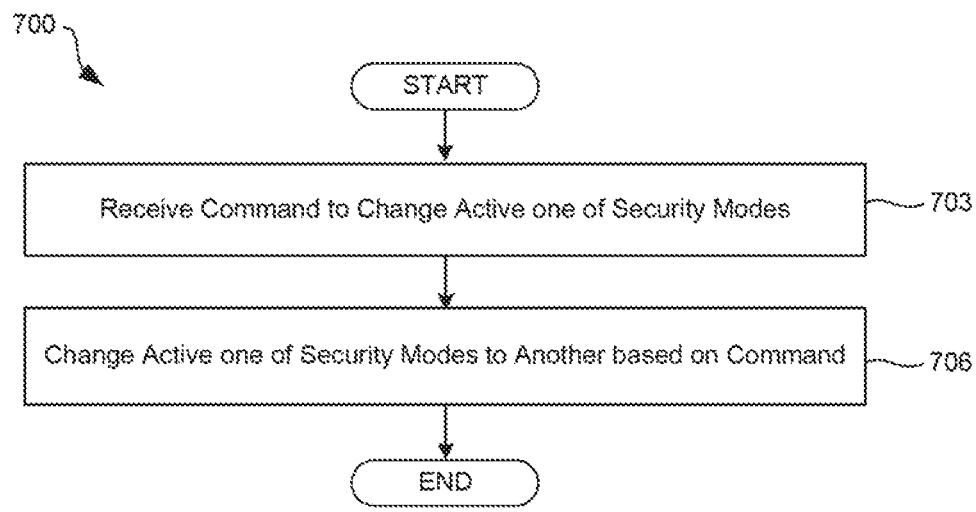
FIG. 7 is another flowchart depicting functionalities implemented by the computing environment and other components of the networked environment.

Turning now to FIG. 7, an example of a flowchart 700 is shown that describes additional steps that can be performed by the computing environment 103. In some examples, an operator of the voice assistant device 118 can perform a vocalized command that directs the computing environment 103 to change an active one of the security modes to another one of the security modes. Accordingly, in step 703, in some examples, the computing environment 103 can receive a command to change an active one of the security modes. The command can include, for example, "Device, switch to DLP mode" or "Device, increase security please."

Thereafter, in step 706, the computing environment 103 can change the active one of the security modes for the voice assistant device 118, for instance, by changing a setting store in the data store 140 in association with a user account 139. As can be appreciated, any requests for enterprise data 130 can be subject to a higher rate of reduction in the event a level of security is increased or, in other words, when a higher security mode is engaged. Similarly, the user can initiate command to lessen the level of security applied to broadcasts of enterprise data by stating. "Device, switch to open mode" or "Device, decrease security please." Thereafter, the process can proceed to completion.

Figure 8:
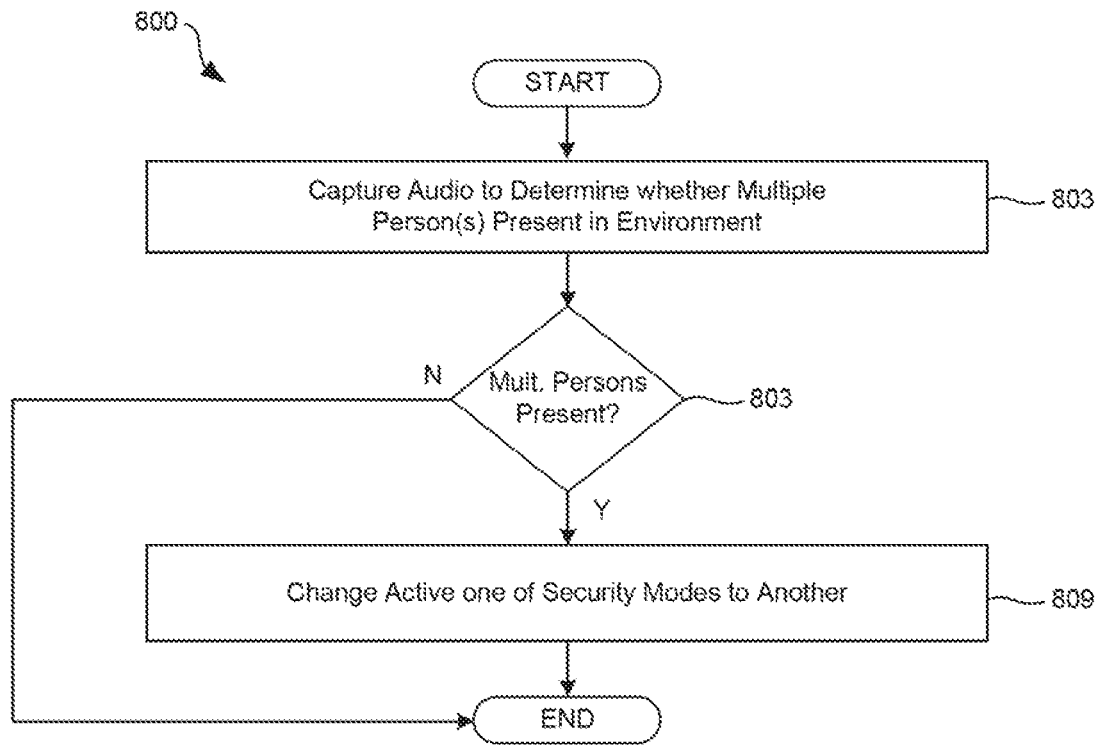
FIG. 8 is another flowchart depicting functionalities implemented by the computing environment and other components of the networked environment.

Referring next to FIG. 8, an example of a flowchart 800 is shown that describes additional steps that can be performed by the computing environment 103 to identify the present of multiple individuals and to change a security mode automatically. Beginning with step 803, the computing environment 103 can capture audio to determine whether multiple persons or individuals are present in an environment, such as an office, cubicle, or other enterprise space in which a broadcast by the speaker 178 of the voice assistant device 118 could be heard.

As such, in step 806, the computing environment 103 can determine whether multiple individuals are present or are in a vicinity of the voice assistant device 118. In some examples, to detect the presence of multiple individuals, the computing environment 103 can be configured to analyze audio data captured using a microphone 180 of the voice assistant device 118. For instance, voices of individuals can be demultiplexed using blind signal separation techniques, and different individuals can be identified based on a comparison of pitch, frequency, speech seed, and other signal factors. Speech having an altitude or volume less than a predetermined threshold can be used to identify individuals beyond a range of a speaker 178 of the voice assistant device 118 using, for example, a volume or other characteristic of the voice assistant device 118, and can be ignored for purposes of identifying multiple individuals.

Additionally, the computing environment 103 can detect presence of multiple people in a room or vicinity of the voice assistant device 118 using feeds from a security camera or a camera of a client device 115 or voice assistant device 118, proximity sensing using NFC tags, Bluetooth® beacons, information-of-things (IoT devices, and so forth. In further examples, the computing environment 103 can detect presence of multiple individuals based on locations of managed client devices 115, for instance, using a combination of global positioning system (GPS) data, wireless fidelity (Wi-Fi) data, positioning data, and other location parameters.

Alternatively, in examples in which the voice assistant device 118 is capable of detecting multiple voices or people in the room, the computing environment 103 can change the security mode from one to another automatically and without human intervention. In further examples, the presence of multiple people can also be detected using ambient noise captured by a microphone of the client device 115 (contrasted with the microphone 180 of the voice assistant device 118), for example, during a login process.

If multiple persons are not present, no change in the security mode of operation is warranted, and the process can proceed to completion. Alternatively, if multiple persons are identified in the vicinity of the voice assistant device 118, the process can proceed to step 809.

In step 809, the computing environment 103 can increase the level of security from one mode to a higher security mode. As can be appreciated, the higher security mode can cause the computing environment 103 to redact additional portions of data as compared to a base level mode or a non-redacted mode. Thereafter, the process can proceed to completion.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 115 can include a display upon which a user interface generated by a client application 184, enterprise data service 106, or another application can be rendered. In some examples, the user interface can be generated with user interface data provided by the computing environment 103. The client devices 115 can also include one or more input/output devices that can include, for example, a capacitive touchscreen or other type of touch input device, fingerprint reader, or keyboard.

Although the workflow service 120, client applications 184, and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of technologies. These technologies can include discrete logic circuits having logic gates for implementing various logic functions upon an application of one or more data signals, application specific integrated circuits having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system. The computer-readable medium can include any one of many physical media, such as magnetic, optical, or semiconductor media. Examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

What is claimed is:

1. A system, comprising:
    at least one computing device; and
    program instructions stored in memory and executable by the at least one computing device that, when executed, direct the at least one computing device to:
        connect a voice assistant device to a remote service that provides enterprise data to be audibly emitted by the voice assistant device;
        receive whitelist data for a mode of operation of the voice assistant device, the whitelist data comprising a first list of words, phrases, or regular expressions to not be redacted;
        receive blacklist data for the mode of operation of the voice assistant device, the blacklist data comprising a second list of words, phrases, or regular expressions to be redacted;
        in response to a request for the enterprise data being received from the voice assistant device, generate an audio signal that audibly broadcasts the enterprise data, wherein at least a first portion of the audio signal is generated to audibly redact at least a first portion of the enterprise data based at least in part on the first portion of the enterprise data matching the blacklist data for the mode of operation of the voice assistant device, and wherein at least a second portion of the audio signal is generated to not audibly redact at least a second portion of the enterprise data based at least in part on the second portion of the enterprise data matching the whitelist data for the mode of operation of the voice assistant device; and
        direct the voice assistant device to emit the enterprise data through a playback of the audio signal.

2. The system of claim 1, wherein the at least one computing device is further directed to:
    maintain, in association with the voice assistant device, a plurality of security modes, the mode of operation of the voice assistant device being one of the security modes, wherein individual ones of the security modes are different from one another; and
    in response to a request for the enterprise data being received from the voice assistant device, identify an active one of the plurality of security modes, wherein the audio signal is generated based at least in part on the active one of the plurality of security modes.

3. The system of claim 2, wherein the at least one computing device is further directed to:
    receive a request to change the active one of the security modes to another one of the security modes based at least in part on a verbalized command received from the voice assistant device.

4. The system of claim 2, wherein the at least one computing device is further directed to:
    adjust the active one of the security modes to another one of the security modes without a verbalized command based at least in part on a sensitivity of at least a portion of the enterprise data.

5. The system of claim 2, wherein:
    the active one of the security modes is enabled based at least in part on: multiple individuals being detected within an audible range of the voice assistant device or an analysis of a calendar item indicating that multiple individuals are present.

6. The system of claim 1, wherein the enterprise data comprises at least one of:
    an email; a calendar item; a reminder; an instant message; and a short message service (SMS) message.

7. The system of claim 1, wherein a portion of the enterprise data is modified by:
    replacing the first portion of the enterprise data with a predetermined audio tone;
    replacing the first portion of the enterprise data with static sound; or
    replacing the first portion of the enterprise data with silence.

8. A non-transitory computer-readable medium comprising machine-readable instructions, wherein the machine-readable instructions, when executed by at least one processor, direct the at least one computing device to at least:
    connect a voice assistant device to a remote service that provides enterprise data to be audibly emitted by the voice assistant device;
    receive whitelist data for a mode of operation of the voice assistant device, the whitelist data comprising a first list of words, phrases, or regular expressions to not be redacted;

receive blacklist data for the mode of operation of the voice assistant device, the blacklist data comprising a second list of words, phrases, or regular expressions to be redacted;

in response to a request for the enterprise data being received from the voice assistant device, generate an audio signal that audibly broadcasts the enterprise data, wherein at least a first portion of the audio signal is generated to audibly redact at least a first portion of the enterprise data based at least in part on the first portion of the enterprise data matching the blacklist data for the mode of operation of the voice assistant device, and wherein at least a second portion of the audio signal is generated to not audibly redact at least a second portion of the enterprise data based at least in part on the second portion of the enterprise data matching the whitelist data for the mode of operation of the voice assistant device; and direct the voice assistant device to emit the enterprise data through a playback of the audio signal.

9. The non-transitory computer-readable medium of claim 8, wherein the at least one computing device is further directed to:

maintain, in association with the voice assistant device, a plurality of security modes, the mode of operation of the voice assistant device being one of the security modes, wherein individual ones of the security modes are different from one another; and in response to a request for the enterprise data being received from the voice assistant device, identify an active one of the plurality of security modes, wherein the audio signal is generated based at least in part on the active one of the plurality of security modes.

10. The non-transitory computer-readable medium of claim 9, wherein the at least one computing device is further directed to:

receive a request to change the active one of the security modes to another one of the security modes based at least in part on a verbalized command received from the voice assistant device.

11. The non-transitory computer-readable medium of claim 9, wherein the at least one computing device is further directed to:

adjust the active one of the security modes to another one of the security modes without a verbalized command based at least in part on a sensitivity of at least a portion of the enterprise data.

12. The non-transitory computer-readable medium of claim 9, wherein:

the active one of the security modes is enabled based at least in part on: multiple individuals being detected within an audible range of the voice assistant device or an analysis of a calendar item indicating that multiple individuals are present.

13. The non-transitory computer-readable medium of claim 8, wherein the enterprise data comprises at least one of: an email; a reminder; a calendar item; an instant message; and a short message service (SMS) message.

14. The non-transitory computer-readable medium of claim 8, wherein a portion of the enterprise data is modified by:

replacing the first portion of the enterprise data with a predetermined audio tone;

replacing the first portion of the enterprise data with static sound; or replacing the first portion of the enterprise data with silence.

15. A method, comprising:

connecting a voice assistant device to a remote service that provides enterprise data to be audibly emitted by the voice assistant device;

receiving whitelist data for a mode of operation of the voice assistant device, the whitelist data comprising a first list of words, phrases, or regular expressions to not be redacted;

receiving blacklist data for the mode of operation of the voice assistant device, the blacklist data comprising a second list of words, phrases, or regular expressions to be redacted;

in response to a request for the enterprise data being received from the voice assistant device, generating an audio signal that audibly broadcasts the enterprise data, wherein at least a first portion of the audio signal is generated to audibly redact at least a first portion of the enterprise data based at least in part on the first portion of the enterprise data matching the blacklist data for the mode of operation of the voice assistant device, and wherein at least a second portion of the audio signal is generated to not audibly redact at least a second portion of the enterprise data based at least in part on the second portion of the enterprise data matching the whitelist data for the mode of operation of the voice assistant device; and directing the voice assistant device to emit the enterprise data through a playback of the audio signal.

16. The method of claim 15, further comprising:

maintaining, in association with the voice assistant device, a plurality of security modes, the mode of operation of the voice assistant device being one of the security modes, wherein individual ones of the security modes are different from one another; and in response to a request for the enterprise data being received from the voice assistant device, identifying an active one of the plurality of security modes, wherein the audio signal is generated based at least in part on the active one of the plurality of security modes.

17. The method of claim 16, further comprising:

receiving a request to change the active one of the security modes to another one of the security modes based at least in part on a verbalized command received from the voice assistant device.

18. The method of claim 16, further comprising:

adjusting the active one of the security modes to another one of the security modes without a verbalized command based at least in part on a sensitivity of at least a portion of the enterprise data.

19. The method of claim 16, wherein:

the active one of the security modes is enabled based at least in part on: multiple individuals being detected within an audible range of the voice assistant device or an analysis of a calendar item indicating that multiple individuals are present.

20. The method of claim 15, wherein:

the enterprise data comprises at least one of: an email; a reminder; a calendar item; an instant message; and a short message service (SMS) message; and a portion of the enterprise data is modified by:

replacing the first portion of the enterprise data with a predetermined audio tone;

replacing the first portion of the enterprise data with static sound; or replacing the first portion of the enterprise data with silence.

\* \* \* \* \*